United States Patent
Takeuchi

(10) Patent No.: US 6,676,875 B1
(45) Date of Patent: Jan. 13, 2004

(54) METHOD OF FORMING RECEPTACLE CONNECTOR INSERT

(75) Inventor: Shinobu Takeuchi, Fukushima (JP)

(73) Assignee: Moldec Co., Ltd., Fukushima (JP)

( * ) Notice: Subject to any disclaimer, the term of this patent is extended or adjusted under 35 U.S.C. 154(b) by 0 days.

(21) Appl. No.: 10/148,134

(22) PCT Filed: Jan. 11, 2000

(86) PCT No.: PCT/JP00/00083
§ 371 (c)(1),
(2), (4) Date: May 28, 2002

(87) PCT Pub. No.: WO01/39951
PCT Pub. Date: Jun. 7, 2001

(30) Foreign Application Priority Data

Nov. 30, 1999 (JP) .......................................... 11/339827

(51) Int. Cl.⁷ .......................... B29C 45/14; B29C 70/72
(52) U.S. Cl. ............. 264/250; 264/272.11; 264/272.15; 264/277; 29/883
(58) Field of Search ................. 264/250, 251, 264/259, 263, 271.1, 272.11, 272.14, 272.15, 274, 275, 277, 278; 29/881, 883, 876

(56) References Cited

U.S. PATENT DOCUMENTS

| | | | | |
|---|---|---|---|---|
| 4,337,574 A | * | 7/1982 | Hughes et al. ................. 29/883 |
| 4,547,964 A | * | 10/1985 | Amano et al. ................. 29/883 |
| 4,817,283 A | * | 4/1989 | Johnston et al. .............. 29/884 |
| 5,074,039 A | * | 12/1991 | Hillbish et al. ................ 29/883 |
| 5,090,117 A | * | 2/1992 | Dickie .......................... 29/840 |
| 5,201,883 A | * | 4/1993 | Atoh et al. .................... 29/883 |
| 5,237,742 A | * | 8/1993 | McClune ....................... 29/882 |
| 5,274,917 A | * | 1/1994 | Corbett et al. ................. 29/860 |
| 5,879,610 A | * | 3/1999 | Beinhaur et al. ............. 264/274 |
| 6,048,482 A | * | 4/2000 | Lemke et al. ................ 264/251 |
| 6,065,951 A | * | 5/2000 | Lemke et al. ................ 425/123 |
| 6,076,258 A | * | 6/2000 | Abe ............................. 29/883 |
| 6,219,913 B1 | * | 4/2001 | Uchiyama .................... 29/883 |
| 6,287,502 B1 | * | 9/2001 | Onoda ......................... 264/263 |

FOREIGN PATENT DOCUMENTS

EP 0 831 564 A3 3/1998
EP 0 831 564 A2 3/1998

* cited by examiner

Primary Examiner—Angela Ortiz
(74) Attorney, Agent, or Firm—Paul A. Guss

(57) ABSTRACT

A method of forming a receptacle connector insert capable of maintaining constant distances between terminal groups even when a receptacle connector has the terminal groups of three rows or more and of being easily produced, comprising the steps of locking a terminal group (2) positioned at both ends to a pair of metal mold main bodies (4) as shown in FIG. 3(a) and holding a terminal group (2) arranged at the center in a rear core (6), moving a front core (5a) arranged on the right side of a curved part (2b) downward while bending the curved part (2b) as shown in FIG. 3(b), storing the curved part (2b) in a second storing part (10a) as shown in FIG. 3(c), moving a front core (5b) arranged on the left side toward the curved part (2b) as shown in FIG. 3(d) and storing the curved part (2b) in a second storing part (10b) as shown in FIG. 3(e), moving the metal mold main bodies (4) from both sides toward each other so as to form a cavity (7) using the metal mold main bodies (4), front core (5), and rear core (6) as shown in FIG. 3(e), and releasing the front cores (5a, and 5b) in the same manner as above, one by one, even when the front core is released.

2 Claims, 6 Drawing Sheets

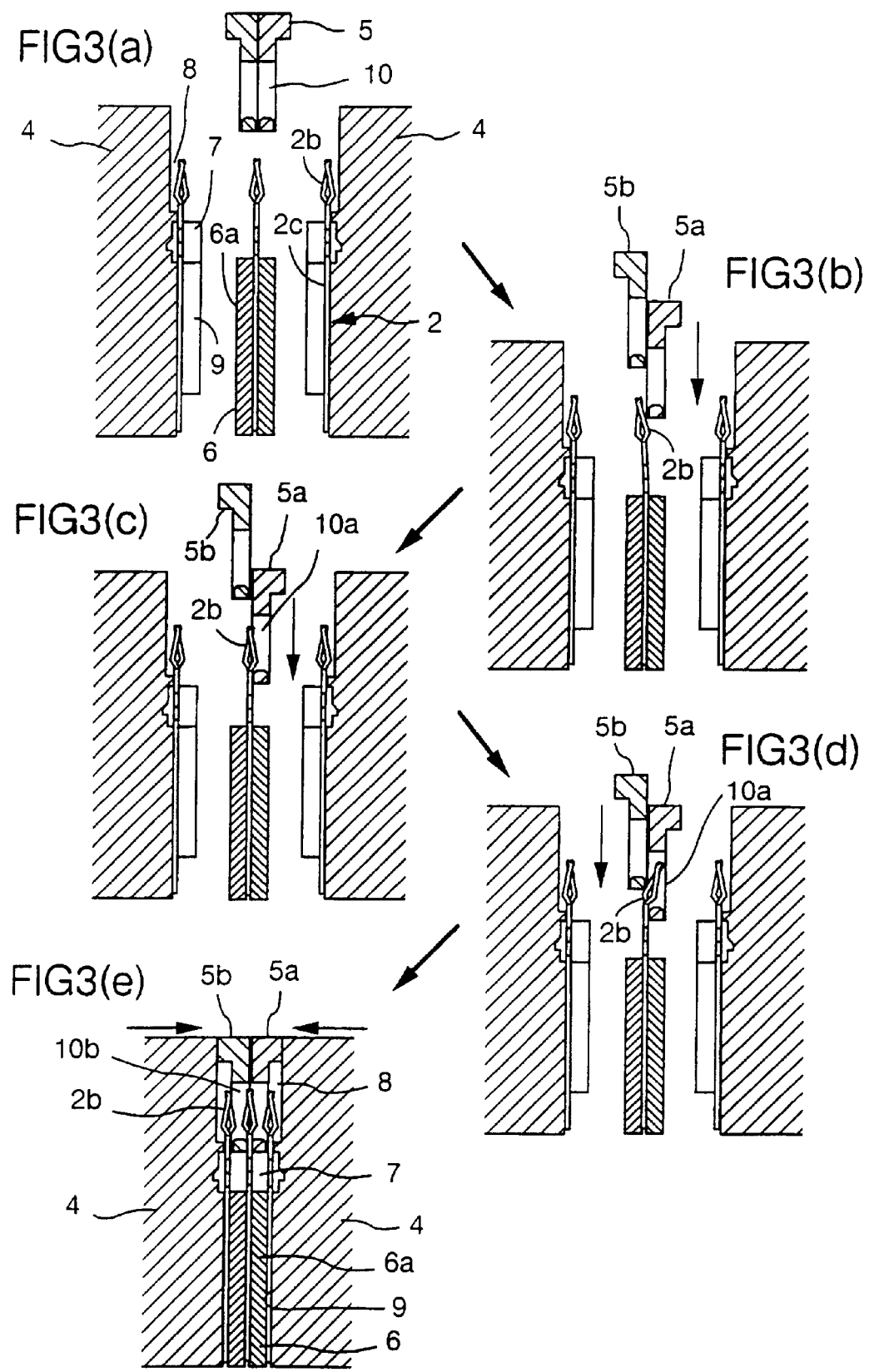

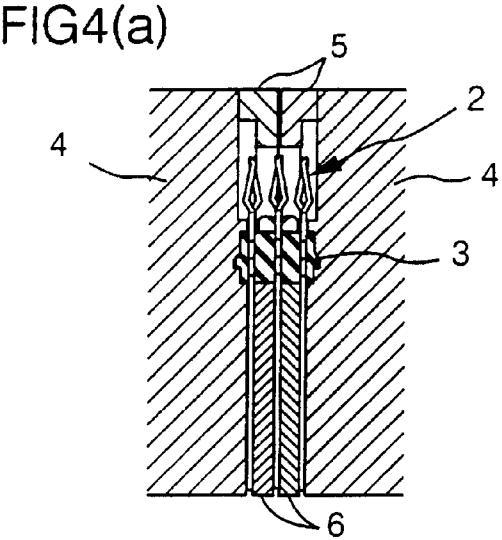
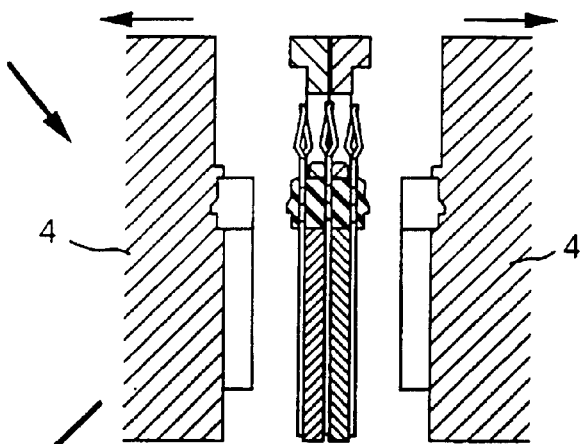
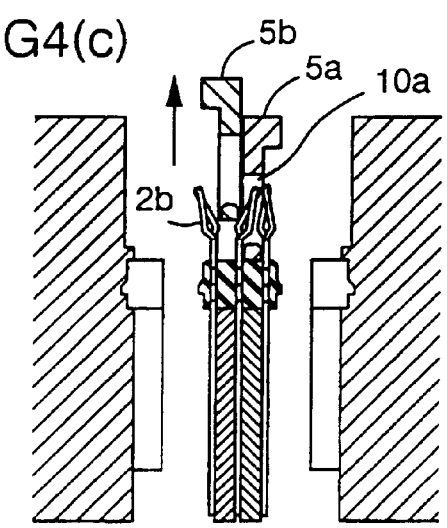
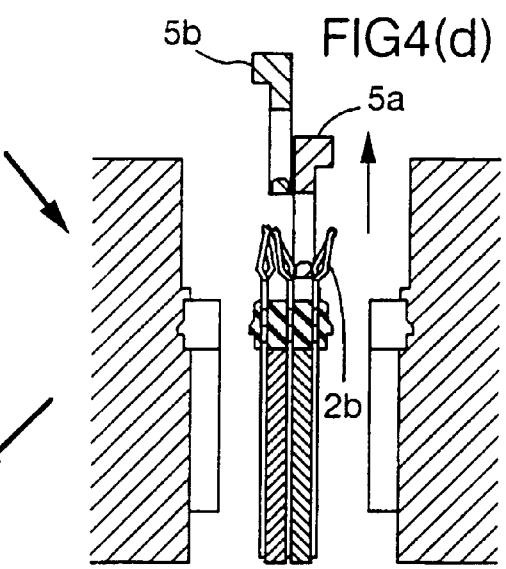
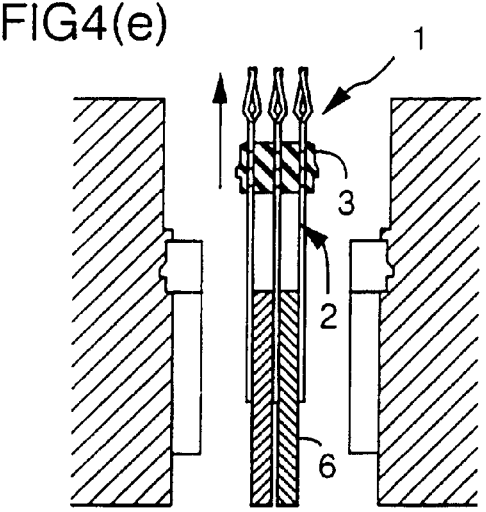

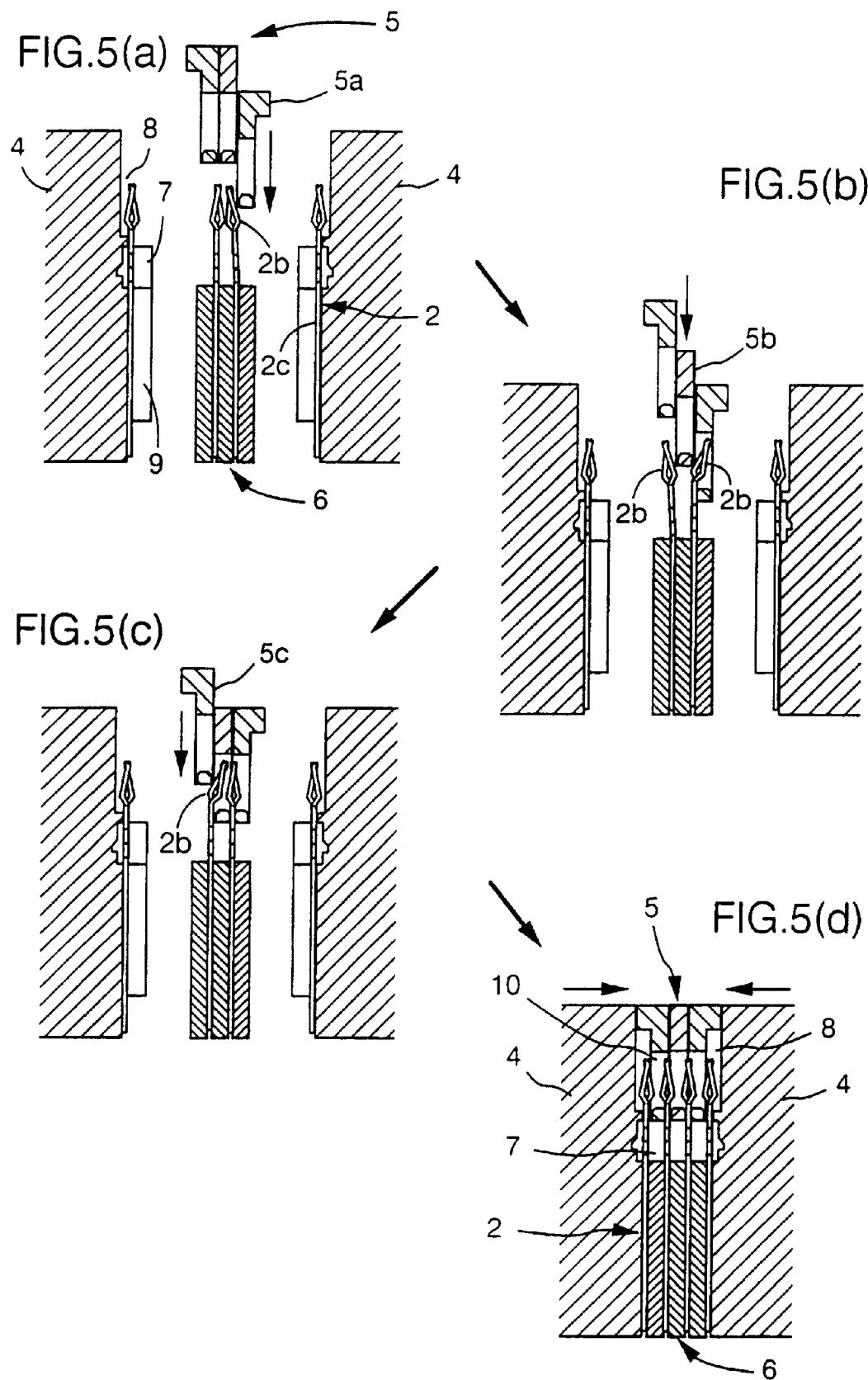

METHOD OF FORMING RECEPTACLE CONNECTOR INSERT

TECHNICAL FIELD

The present invention relates to an insert molding method of a receptacle connector.

BACKGROUND ART

There is a receptacle connector (a female type connector) having a terminal 21 formed in a tulip shape in a side elevational view in which a curved portion 21a curving in a thickness direction thereof is formed, as shown in FIG. 6(a), for the purpose of gripping a plug connector (a male type connector) connected thereto.

In the case of forming the receptacle connector provided with the terminal in which the curved portion is formed in accordance with an insert molding method, it is necessary to form a metal mold with keeping clear of the curved portion of the terminal.

In the case of a connector having one row of terminal group in which a plurality of terminals are provided in parallel in a width direction, it is possible to easily execute the insert molding by forming a pair of metal molds 22 so as to run off the curved portion 21a, as shown in FIG. 6(a).

Further, as disclosed in Japanese Patent Publication No. 8-415 filed by the inventor of the present application, even in the case that the terminal group is constituted by two rows of connectors, the insert molding can be executed. In particular, as shown in FIG. 6(b), the insert molding is executed by forming a metal mold core 23 placed in a side of the curved portion 21a so as to run off the curves portion 21a in the terminal group, bringing the metal mold members 22 to which the terminal group 21 is attached into contact from both sides of the core 23 so as to form a cavity 24, and injecting a resin within the cavity 24 so as to form a mold portion 25.

Thereafter, as shown in FIG. 6(c), the insert molding of the receptacle connector in which the terminal group is constituted by two rows of terminals is excuted, by drawing out the connector from the core 23 within an elastic limit of the curved portion 21a in the terminal group 21.

On the contrary, in recent years, a connector provided with a lot of terminal groups is required, and a connector provided with three or more rows of terminal groups is also desired. However, in the case that the terminal groups having the curved portions are provided in three rows or more, there are generated two or more portions in which the curved portions are overlapped and an interval thereof is made narrow, so that it is impossible to form in accordance with the conventional insert molding method.

Accordingly, in conventional, in the case of forming the receptacle connector provided with three or more rows of terminal groups, the formation is executed by insert molding one row of terminal group so as to form a mold portion, and thereafter combining them in three rows or more rows so as to adhere in accordance with an adhesive agent or an ultrasonic welding, or pressure inserting the mold portion combined in three or more rows into an independently formed case.

However, in the connector formed in accordance with the method mentioned above, there is a case that distances between the terminal groups are dispersed in some adhering states between the respective mold portions. Since a transmission impedance of the connector is dispersed when the distances between the terminal groups are dispersed, there is a risk that a transmission loss of a signal is increased particularly in the case of the connector for transmitting the signal having a high frequency.

Further, in accordance with the method mentioned above, since it is necessary to once execute the insert molding and thereafter combine the connector in three or more rows so as to fix, there is a disadvantage that a manufacturing step becomes complex.

An object of the present invention is to improve an insert molding method of a receptacle connector, and more particularly to provide an insert molding method of a receptacle connector which can keep a distance between terminals constant and can easily manufacture, even in the receptacle connector having three or more rows of terminal groups, for the purpose of solving the disadvantage mentioned above.

DISCLOSURE OF THE INVENTION

In order to achieve the object mentioned above, the present invention is an insert molding method of a receptacle connector having a terminal group in which a plurality of terminals having tulip-shaped curved portions in a side view are provided in a width direction in a front end of a flat plate portion, and a mold portion which is provided with at least three rows of the terminal groups in a thickness direction in parallel and is integrally formed with a part of the flat plate portion, characterized by the following matters.

At first, a cavity for forming the mold portion is structured such as to be formed by being surrounded by a pair of metal mold bodies formed so as to move close to and apart from each other in a thickness direction of the terminal groups, having first receiving potions for receiving the curved portion and forming a side surface of the cavity, a plurality of front cores arranged between the terminal groups, having second receiving portions formed so that the curved portion can deflect in the thickness direction, formed so as to freely move close to a front portion of the terminal and apart therefrom and forming a front surface of the cavity, and a plurality of rear cores arranged between the terminal groups at the back of the front cores and forming a rear surface of the cavity. Further, the receptacle connector is formed in accordance with the following steps.

At first, there is provided a step of receiving the curved portions in the first receiving portion so as to hold the terminals arranged at both ends, among the terminal groups arranged in three rows or more in parallel, in the pair of metal mold body, and respectively gripping flat plate portions of the terminal groups arranged at middle positions by a plurality of rear cores.

Next, there is provided a step of moving forward the front cores arranged in one side in the thickness direction of the curved portion from front portions of the curved portions so as to deflect the curved portions of the terminal groups, receiving the curved portions in the second receiving portion, thereafter moving forward the front cores arranged in another side in the thickness direction of the curved portion from front portions of the curved portions so as to deflect the curved portions of the terminal groups, and receiving the curved portions in the second receiving portion.

There are provided a step of thereafter moving a pair of metal mold bodies close to each other so as to form the cavity, a step of injecting a resin within the cavity so as to cure the resin, thereby forming the mold portion, and a step of moving a pair of metal mold bodies apart from each other.

Next, there is provided a step of moving backward the front cores arranged in one side in the thickness direction of the curved portion so as to remove while deflecting the curved portions and thereafter moving backward the front cores arranged in another side so as to remove while deflecting the curved portion.

Further, there is provided a step of removing the terminal group and the mold portion from the rear cores.

In accordance with the insert molding method of the receptacle connector of the present invention, among the terminal groups arranged in three or more rows in parallel, the terminal groups arranged at the middle position are gripped by the rear cores, and the front cores are moved forward one side by one side toward the gripped terminal groups with respect to the terminal groups.

When moving forward the front cores in one side toward the terminal groups, the curved portion is pressed to the front cores from one direction, so that the terminal groups are deflected.

Further, when moving forward the front cores in one side, the curved portions are received in the second receiving portion provided in the front cores. Next, when moving forward the front cores in another side toward the terminal groups, the curved portions are pressed to the front cores from another side.

At this time, since the curved portions are received in the second receiving portion of the front cores in one side, the curved portions of the terminal elements are deflected within the second receiving portion.

When further moving forward the front cores in another side, the curved portions are received in the second receiving portions provided in the front cores.

Next, by moving a pair of metal mold main bodies close to the front cores and the rear cores together with the terminal groups arranged at both end positions, the cavity is formed.

At this time, the curved portions of the terminal groups arranged at both end positions are received in the first receiving portion.

As mentioned above, in accordance with the present invention, even in the case that the respective curved portions are overlapped between the terminal groups in three rows or more and the number of the portions having the narrow interval is two or more, it is possible to arrange the front cores between the terminal groups so as to form the cavity.

Accordingly, even in the case of the receptacle connector provided with three rows or more terminal groups, it can be formed in accordance with the insert molding, so that it is possible to keep the distance between the terminal groups constant.

Therefore, it is possible to form the connector in which the transmission impedance is not dispersed and there is no fear that the transmission loss is not increased even in the case of transmitting the signal having the high frequency.

Further, since it is possible to form the receptacle connector provided with three or more rows of terminal groups in accordance with one insert molding operation, it is easy to manufacture the receptacle connector mentioned above.

Further, in the insert molding method of the receptacle connector in accordance with the present invention, it is preferable to sequentially move forward the front cores toward the curved portion so as to move from the front cores arranged in an end portion in one side toward an end portion in another side, among the front cores, in the step of moving forward the cores from the front portion of the curved portion, and to sequentially move backward the front cores so as to move from the front cores arranged in the end portion in one side toward the end portion in another side, among the front cores, in the step of moving backward the front cores so as to remove, thereby removing the front cores.

As mentioned above, by sequentially moving forward and backward the front cores from the end portion in one side, it is possible to sequentially move forward and backward the front cores from one side of the curved portion.

Further, even in the case of increasing or reducing the number of the rows of the terminal groups provided in parallel, since it is sufficient to sequentially move forward and backward the front cores from one side, it is possible to correspond to the increase and reduction of the number of the rows of the terminal groups without changing the control of moving forward and backward the front cores.

BEST MODE FOR CARRYING OUT THE INVENTION

Next, a description will be given of an embodiment of an insert molding method of a receptacle connector in accordance with the present invention with reference to FIGS. 1 to 5.

Figure 1:
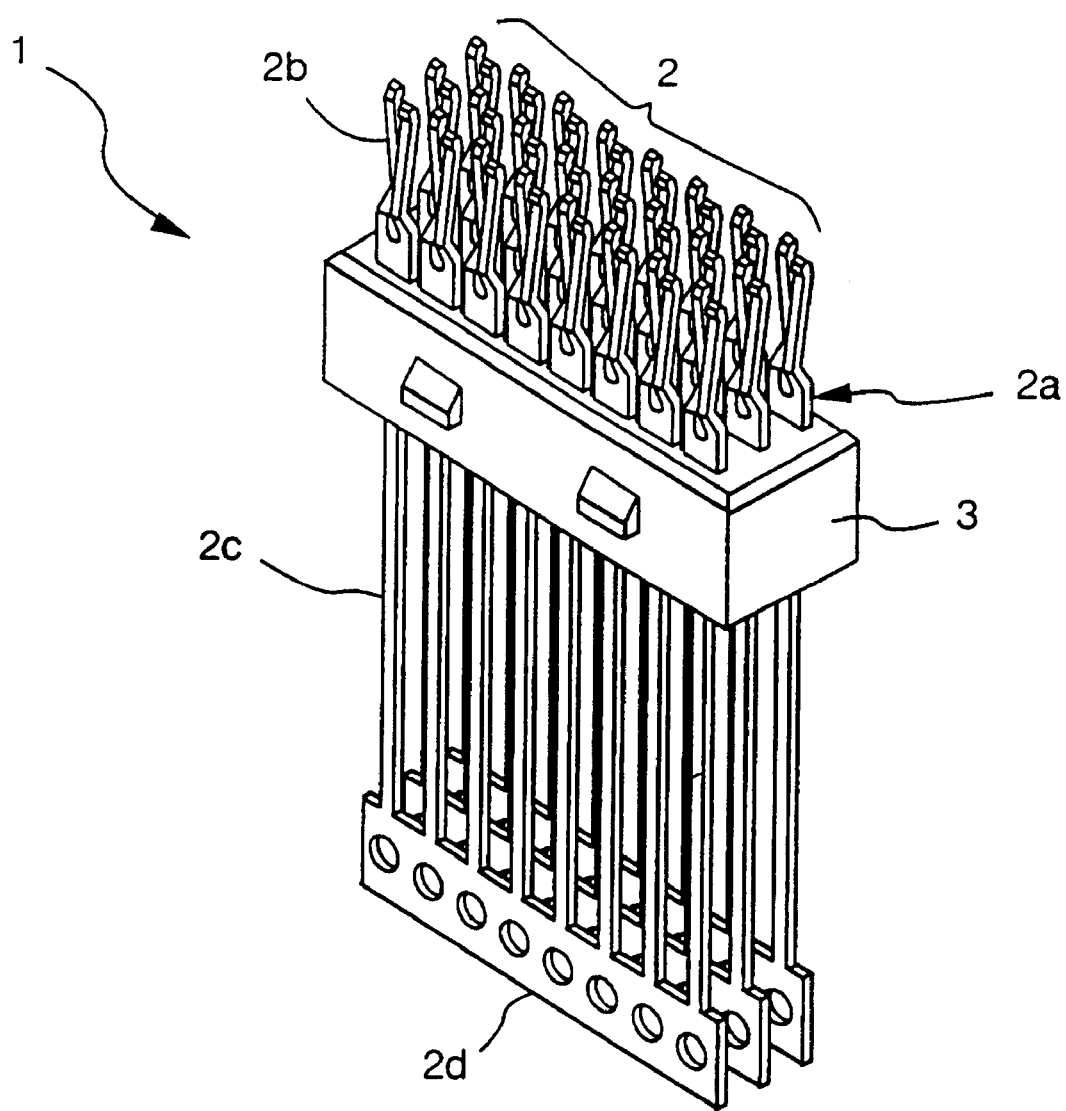
FIG. 1 is a schematic view showing a receptacle connector formed by the insert molding method in accordance with the present invention.

A receptacle connector 1 formed in accordance with an insert molding method of the present invention is provided with so-called tuning fork shaped terminals 2a formed in a tulip shape in a side view, and a mold portion 3 integrally formed with the terminals 2a, as shown in FIG. 1. The terminal 2a is structured such that a curved portion 2b alternately curved in a substantially L shape in a thickness direction is provided in a front end portion, and a flat plate portion 2c is provided at the rear thereof. Further, a rear end portion of the flat plate portion 2c is connected by a carrier 2d, whereby a terminal group 2 is formed. The mold portion 3 is formed by an insulative synthetic resin. In accordance with the present embodiment, a description will be given of the insert molding method of the receptacle connector 1 in which the terminal groups 2 are provided in three rows in parallel.

Figure 2:
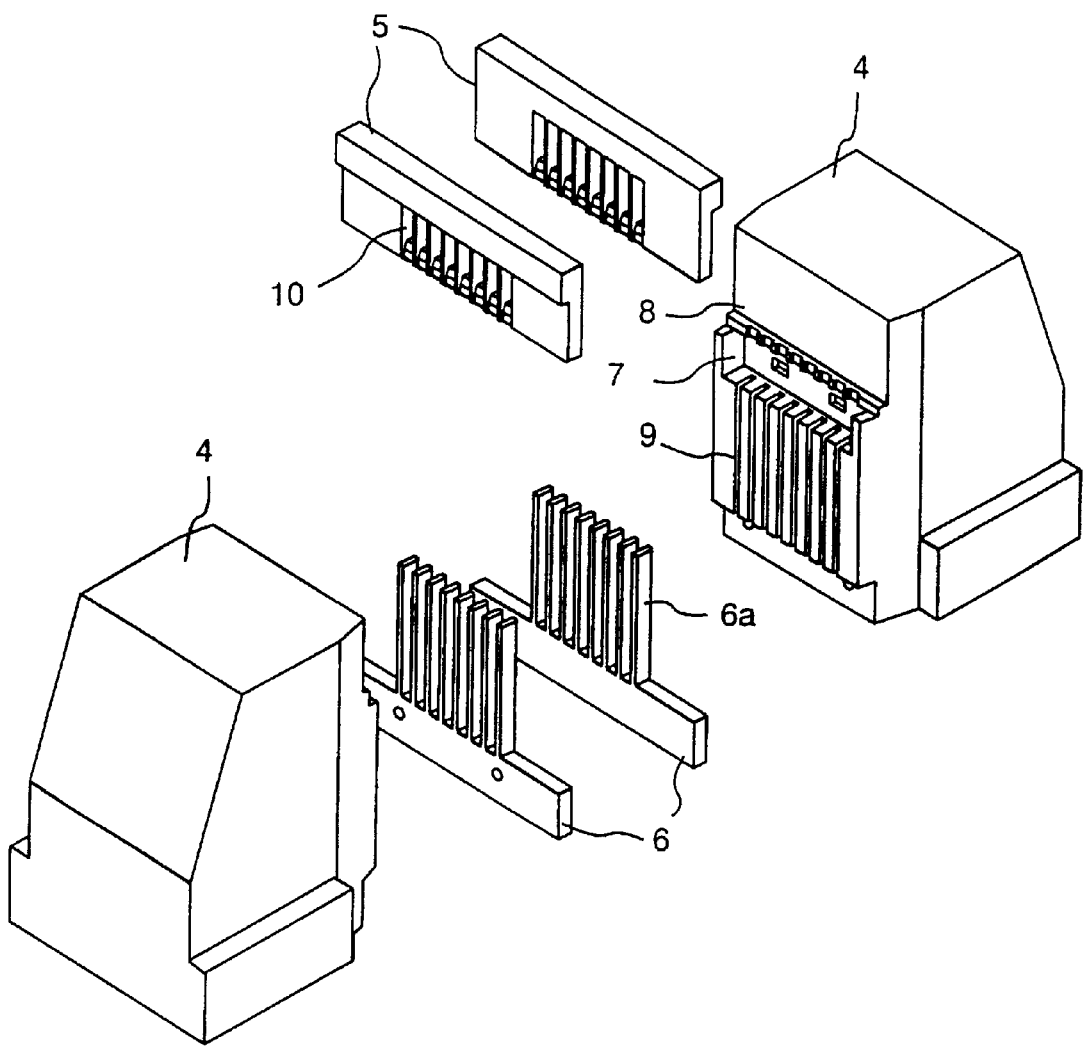
FIG. 2 is a schematic view showing a metal mold used for the insert molding method in accordance with the present invention, FIGS. 3(a–e) is a schematic view showing a step of forming a cavity by the metal mold, FIGS. 4(a–e) is a schematic view showing a step of taking out the receptacle connector formed in accordance with the insert molding from the metal mold, FIGS. 5(a–d) a schematic view showing a step of forming the cavity in the case that four rows of terminal groups are provided, and FIGS. 6(a–c) is a schematic view showing an insert molding method of a receptacle connector in accordance with a conventional art.
Figure 6A:
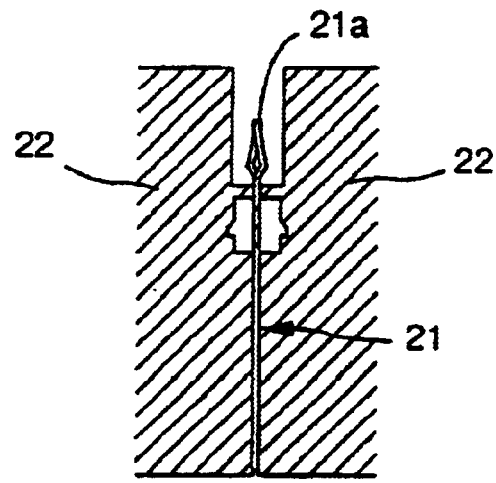
Figure 6B:
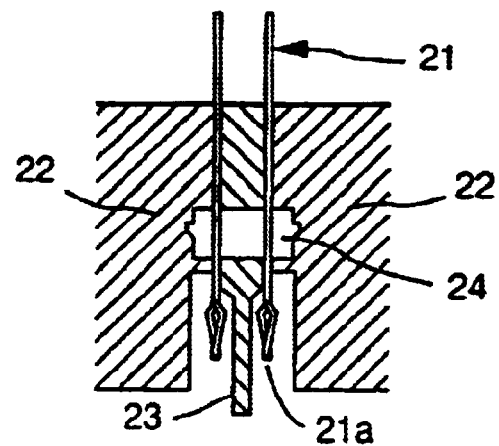
Figure 6C:
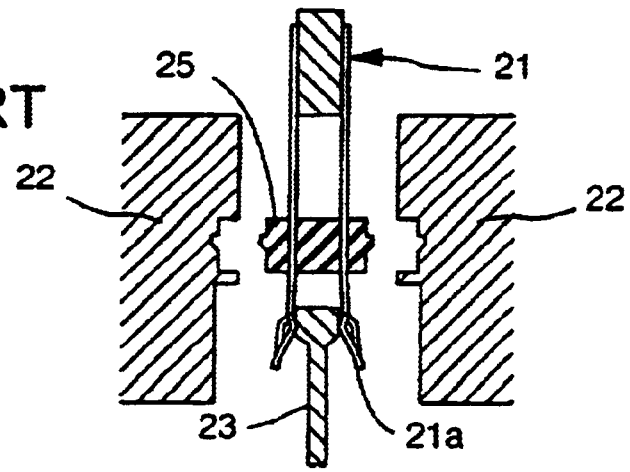

A metal mold executing the insert molding of the mold portion 3 is, as shown in FIG. 2, formed by a pair of metal mold main bodies 4 provided so as to freely move close to and apart from each other in a thickness direction of the terminal group 2, front cores 5 formed so as to freely move close to and apart from each other from a front portion of the terminal 2a, and rear cores 6 gripping the flat plate portion 2c at the rear of the terminal 2a therebetween.

A cavity 7 forming the mold portion 3 is formed by the metal mold main bodies 4, the front cores 5 and the rear cores 6.

The metal mold main body 4 is structured, as shown in FIGS. 2 and 3(e), such that a first receiving portion 8 for receiving the curved portions 2b of the terminal group 2 is formed in an upper portion of the cavity 7, and groove portions 9 to which the flat plate portions 2c of the terminals 2a and fitting and inserting portions 6a of the rear cores 6 are fitted and inserted are formed in a lower portion of the cavity 7.

The core 5 is formed in an inverse L shape in a side surface view as shown in FIGS. 2 to 4, and a second receiving portion 10 in which the second curved portions 2b of the terminals 2a are received is formed therein. The second receiving portion 10 is formed by providing through holes extending through the front core 5, as shown in FIGS. 3 and 4.

The rear core 6 is formed in an inverse T shape in a front elevational view, grips the flat plate portions 2c of the terminals 2a and is provided with the fitting and inserting portions 6a inserted and fitted to the groove portions 9 of the metal main body 4.

The receptacle connector 1 in accordance with the present embodiment is formed by the following steps.

At first, as shown in FIG. 3(a), among the terminal groups 2 provided in three rows in parallel, the flat plate portions 2c of the terminal groups positioned at both ends are inserted and fitted to the groove portions 9 of the metal mold main bodies 4, and the terminal groups 2 are engaged with a pair of metal mold main bodies 4.

At this time, the curves portions 2b of the terminal groups 2 positioned at both ends are received in the first receiving portions 8 provided in the metal mold main bodies 4.

Then, the terminal groups 2 arranged in a center are gripped by the rear cores 6.

In this case, at a time of gripping the terminal groups 2 by the rear cores 6, two pins extending through the rear cores 6 from one of the metal mold main bodies toward another side may be provided in an extending manner (not shown), and these two pins (not shown) may be inserted to communication holes provided in the carriers 2d of the terminal groups 2, thereby positioning.

Next, among a pair of cores 5, a front core 5a arranged in a right side of the curved portions 2b in FIG. 3(b) is moved forward toward the curved portion 2b.

Then, as shown in FIG. 3(b), since a front end portion of the front core 5a is brought into contact with front ends of the curved portions 2b, the curved portions 2b of the terminal group 2 arranged in a center are pressed leftward in FIG. 3(b). At this time, since a front core 5b arranged in a left side of the terminal groups 2 is above the curved portions 2b, a deflection thereof is not prevented, so that it is possible to deflect the curved portions 2b leftward.

When moving forward the front core 5a further to a lower side from this state, the curved portion 2b is received in a second receiving portion 10a provided in the front core 5a, as shown in FIG. 3(c).

Next, among a pair of front cores 5, as shown in FIG. 3(d), the front core 5b arranged in the left side of the curved portions 2b in the terminal group 2 arranged in the center is moved forward toward the curved portions 2b.

Then, as shown in FIG. 3(d), the curved portions 2b are pressed rightward in FIG. 3(d) by a front end portion of the front core 5b.

At this time, since the curved portion 2b is received within the second receiving portion 10a of the front core 5a, and a deflection thereof is not prevented, it is possible to deflect the curved portions 2b rightward.

When moving forward the front core 5b further to a lower side from this state, the curved portion 2b is received in a second receiving portion 10b provided in the front core 5b, as shown in FIG. 3(e).

Next, when moving a pair of metal mold main bodies 4 close to each other from both sides toward the front cores 5 and the rear cores 6 from this state, the fitting and inserting portions 6a of the rear cores 6 and the flat plate portions 2c of the terminal groups 2 are fitted and inserted to the groove portions 9 in the metal mold main bodies 4.

Accordingly, as shown in FIG. 3(e), the cavity 7 surrounded by the metal mold main bodies 4, the front cores 5 and the rear cores 6 is formed.

Further, as shown in FIG. 4(a), a molten resin is injected within the cavity 7, and thereafter the molten resin is cured.

Accordingly, the mold portion 3 is integrally formed with three rows of terminal groups 2.

Next, as shown in FIG. 4(b), a pair of metal mold main bodies 4 are moved to both sides from the state in which the mold portion 3 is formed.

At this time, since the terminal groups 2 arranged in both ends among the terminal groups arranged in three rows are integrally formed with the terminal group 2 arranged in the center and the mold portion 3, they are removed from the metal mold main bodies 4 in accordance with a movement of the metal mold main bodies 4.

Next, as shown in FIG. 4(c), the front core 5b arranged in the left side is drawn upward.

At this time, the front end portion of the front core 5b is brought into contact with the curved portions 2b of the terminal group 2 arranged in the left side in FIG. 4(c) and the curved portion 2b of the terminal group 2 arranged in the center.

Further, since the left terminal group 2 in FIG. 4(c) is deflected leftward and the terminal group 2 arranged in the center is deflected within the second receiving portion 10a of the front core 5a, it is possible to draw up the front core 5b upward.

Next, as shown in FIG. 4(d), the front core 5a arranged in the right side is also drawn upward in the same manner as that of the left front core 5b while deflecting the curved portions 2b of the terminal groups 2 arranged in the right and left sides thereof.

Finally, as shown in FIG. 4(e), the flat plate portions 2c of the terminal groups 2 are taken out from the rear cores 6 by an ejector pin (not shown).

Accordingly, the receptacle connector 1 shown in FIG. 1 is formed.

Here, in the case of being over an elastic limit of the terminal groups 2 at a time of moving backward the front cores 5 from the receptacle connector 1 so as to remove, whereby the terminal groups 2 are bent, the terminal groups 2 are formed by using a jig (not shown).

Next, a description will be given of a method of insert molding a receptacle connector 1 in which the terminal groups 2 are provided in four lines in parallel, in accordance with another embodiment of the present invention.

In this case, in the present embodiment, the same reference numerals are attached to elements having the same structures as those of the embodiment mentioned above, and a detailed description will be omitted.

In the present embodiment, as shown in FIG. 5(d), the terminal groups 2 are provided in four rows, and the front cores 5 and the rear cores 6 are provided in three rows. In the present embodiment, in the same manner as that of the embodiment mentioned above, among the terminal groups 2 provided in four rows, the terminal groups 2 arranged in both end sides are held in the metal mold main body 4, and the terminal groups 2 arranged in a middle position are respectively gripped by the rear cores 6.

Then, in FIG. 5(a), a front core 5a arranged in a right side end portion is moved forward to a lower portion while deflecting the curved portions 2b of the terminal group 2 in a left side thereof.

Next, as shown in FIG. 5(b), a front core 5b arranged in the center is moved forward to the lower portion while deflecting the curved portions 2b of the terminals 2 in both sides thereof.

Next, a front core 5c arranged in a left side end portion is moved forward to the lower portion while deflecting the curved portions 2b of the terminal group 2 in a right side thereof.

Finally, as shown in FIG. 5(d), a pair of metal mold main bodies 4 are moved close to each other from the right and left sides so as to form the cavity 7.

Further, a molten resin is injected within the cavity 7 so as to form the mold portion 3, the metal mold main bodies 4 are moved rightward and leftward, and the front cores 5 are sequentially moved backward from the front core 5c toward the front core 5a, whereby the receptacle connector is formed.

In the present embodiment, since a plurality of front cores 5 provided in parallel are sequentially moved forward and backward from one side toward another side, it is possible to deflect the curved portion 2b of the terminal groups 2 so as to form the cavity 7, and it is possible to deflect the curved portions 2b of the terminals groups 2 so as to remove the front core 5 even after the mold portion 3 is formed.

In this case, in the embodiment mentioned above, the front cores 5 provided in three rows in parallel are sequentially moved forward to the lower portion from one direction, however, the structure is not limited to this, and the structure may be made such that the front core 5b at the middle position is first moved forward to the lower portion and next any of the right and left front cores 5a and 5c is moved forward to the lower portion.

Otherwise, the structure may be made such that the right and left front cores 5a and 5c are simultaneously moved forward to the lower portion and next the front core 5b at the middle position is moved forward to the lower portion.

Further, in each of the embodiments mentioned above, the description is given of the receptacle connector in which the terminal groups 2 are in three rows or four rows, however, even when they are in five rows or more, the insert molding can be executed in the same manner.

Further, in each of the embodiments mentioned above, the description is given of the receptacle connector in which the curved portions 2b have the so-called tuning fork shaped terminals, however, the same matter is applied to a structure in which the curved portions 2b have so-called tulip-shaped terminals formed by overlapping two plate members in a thickness direction of the curved portions 2b.

INDUSTRIAL APPLICABILITY

As mentioned above, the present invention is useful as the method of manufacturing the receptacle connector having three or more rows of terminal groups.

What is claimed is:

1. An insert molding method of a receptacle connector having a terminal group in which a plurality of terminals having tulip-shaped curved portions in a side view are provided in a width direction in a front end of a flat plate portion, and a mold portion which is provided with at least three rows of said terminal groups in a thickness direction in parallel and is integrally formed with a part of said flat plate portion, characterized in that:

a cavity for forming said mold portion is structured such as to be formed by being surrounded by a pair of metal mold bodies formed so as to move close to and apart from each other in a thickness direction of said terminal groups, having first receiving potions for receiving said curved portion and forming a side surface of said cavity, a plurality of front cores arranged between said terminal groups, having second receiving portions formed so that said curved portion can deflect in the thickness direction, formed so as to freely move close to a front portion of said terminal and apart therefrom and forming a front surface of said cavity, and a plurality of rear cores arranged between said terminal groups at the back of said front cores and forming a rear surface of said cavity, and the method comprises:

a step of receiving said curved portions in said first receiving portion so as to hold the terminals arranged at both ends, among said terminal groups arranged in three rows or more in parallel, in said pair of metal mold body, and respectively gripping flat plate portions of the terminal groups arranged at middle positions by said plurality of rear cores;

a step of moving forward the front cores arranged in one side in the thickness direction of said curved portion from front portions of said curved portions so as to deflect the curved portions of said terminal groups, receiving said curved portions in said second receiving portion, thereafter moving forward the front cores arranged in another side in the thickness direction of said curved portion from front portions of said curved portions so as to deflect the curved portions of said terminal groups, and receiving said curved portions in said second receiving portion;

a step of thereafter moving said pair of metal mold bodies close to each other so as to form the cavity;

a step of injecting a resin within said cavity so as to cure said resin, thereby forming said mold portion;

a step of moving said pair of metal mold bodies apart from each other;

a step of moving backward the front cores arranged in one side in the thickness direction of said curved portion so as to remove while deflecting said curved portions and thereafter moving backward the front cores arranged in another side so as to remove while deflecting said curved portion; and a step of removing said terminal groups and said mold portions from said rear cores.

2. An insert molding method of a receptacle connector as claimed in claim 1, characterized by sequentially moving forward said front cores toward said curved portion so as to move from said front cores arranged in an end portion in one side toward an end portion in another side, among said front cores, in the step of moving forward said cores from the front portion of said curved portion, and sequentially moving backward said front cores so as to move from said front cores arranged in the end portion in one side toward the end portion in another side, among said front cores, in the step of moving backward said front cores so as to remove, thereby removing the front cores.

* * * * *